United States Patent [19]

Becker et al.

[11] Patent Number: 6,023,280

[45] Date of Patent: Feb. 8, 2000

[54] CALCULATION AND VISUALIZATION OF TABULAR DATA

[75] Inventors: Richard Alan Becker, Mendham; Linda Ann Clark, Mountainside, both of N.J.; Kenneth Charles Cox, Naperville, Ill.; Diane Lambert, Berkeley Heights, N.J.

[73] Assignee: Lucent Technologies Inc., Murray Hill, N.J.

[21] Appl. No.: 08/806,735

[22] Filed: Feb. 27, 1997

Related U.S. Application Data

[60] Provisional application No. 60/012,441, Feb. 28, 1996.

[51] Int. Cl.[7] .................................................. G06T 11/20
[52] U.S. Cl. ........................................ 345/440; 345/338
[58] Field of Search ........................... 707/3, 4, 102–104, 707/907; 705/40, 35; 345/968, 440, 338

[56] References Cited

U.S. PATENT DOCUMENTS

| | | | |
|---|---|---|---|
| 5,136,690 | 8/1992 | Becker et al. | 395/161 |
| 5,462,438 | 10/1995 | Becker et al. | 434/430 |
| 5,564,048 | 10/1996 | Eick et al. | 395/600 |
| 5,584,024 | 12/1996 | Shwartz | 707/4 |
| 5,768,354 | 6/1998 | Lange et al. | 379/189 |
| 5,832,456 | 11/1998 | Fox et al. | 705/10 |

OTHER PUBLICATIONS

Visualizing Corporate Data, AT&T Technical Journal, Jan./Feb. 1996, by Stephen Eick and Daniel E. Fyock.

*Primary Examiner*—Mark R. Powell
*Assistant Examiner*—Thu Nguyen

[57] ABSTRACT

Method and apparatus for providing visualization of information contained in a data set is provided. The data set is arranged in first and second categories of data, and a selection variable and a summary variable are chosen from the second category of data. A unique value is located in the first category of data which matches each selection variable, and a statistical summary of the summary variables is computed for each located unique value in the first category of data. The resultant display is based on the computation of the statistical summary.

6 Claims, 14 Drawing Sheets

FIG. 5

FIG. 7 argna (44/15 of 95)
astla (100/22 of 152)
belgm (49/13 of 79)
brazl (111/35 of 247)
china (240/42 of 462)
clmba (101/32 of 146)
frnce (149/67 of 250)
grmny (514/88 of 909)
guyna (57/5 of 96)
haiti (199/117 of 369)
hngng (192/54 of 367)
india (219/72 of 399)
isrel (143/37 of 225)
italy (120/55 of 204)
japan (142/60 of 213)
korea (155/22 of 364)
mexco (90/33 of 200)
ngria (47/9 of 273)
nthds (126/30 of 317)
phlip (48/18 of 97)
snpre (74/16 of 126)
stluc (52/1 of 97)
swedn (51/20 of 89)
switz (287/54 of 484)
taiwn (156/39 of 317)
thlnd (95/16 of 202)
uk (574/161 of 1055)
ukran (216/55 of 406)

CALCULATION AND VISUALIZATION OF TABULAR DATA

CROSS-REFERENCE TO PROVISIONAL APPLICATION

This application claims the benefit of U.S. provisional application, Ser. No. 60/012,441, filed on Feb. 28, 1996.

BACKGROUND OF THE INVENTION

1. Field of the Invention

This invention relates to visualization as a tool for understanding large and complicated data sets and, more particularly, the use of a visualization scheme to make maximum use of display space in order to display selective portions of a large database, which portions best describe what the user wants to see.

2. Description of the Prior Art

Modern businesses today retain and utilize huge amounts of data. Advances in storage technology have made this possible, while, at the same time, a solution is needed for the effective understanding and utilization of this wealth of stored information.

Prior art methods of accessing and understanding large amounts of stored data have included statistical analysis, spread sheets and summaries. However, these methods are becoming less effective as the amount of stored, accessible data increases. Indeed, many businesses have recognized that the resources expended to store large amounts of data are essentially wasted unless better methods of accessing and understanding the data are developed.

Various methods of efficiently accessing large amounts of data have been developed. For example, U.S. Pat. No. 5,462,438, issued Oct. 31, 1995, describes a method of displaying multiple time series and associated generated displays. In this patent "cave" plots are utilized as a graphical technique for comparing two time series using overlapping and opposing coordinate systems. The cave plots are space-efficient, allowing comparisons involving many data points.

Similarly, U.S. Pat. No. 5,136,690, issued Aug. 4, 1992, describes a dynamic graphical map analysis of telephone network data. A user of this system may dynamically reduce in real-time displayed clutter by controlling the length of the displayed links interconnecting telephone network nodes.

Another example of efficiently handling large amounts of data for display purposes is U.S. Pat. No. 5,564,048, issued on Oct. 8, 1996. This patent describes an object-oriented programming system and, more particularly, the use of specific libraries that enhance the use of graphical user interfaces for computer systems.

Also, of interest is an article published in the AT&T Technical Journal, January/February 1996, entitled "Visualizing Corporate Data" by Stephen Eick and Daniel E. Fyock. This article is directed to the use of visualization as an emerging technology for understanding large, complex, information-rich data sets. It discusses the use of visualization for presenting information in pictorial form, and the use of human recognition capabilities to detect patterns. It also discusses the control of visual characteristics such as color, shape and zoom level, as well as linking multiple views to observe the interrelation of various data sets, and the use of interactive filters to reduce the amount of information shown on a display. The use of "drill down" which will display actual data values associated with a particular portion of the displayed data is also described.

Notwithstanding the known information referred to above, a need still exists to provide effective interactive visualization of data contained in large databases. This invention fulfills that need.

SUMMARY OF THE INVENTION

The invention is directed to method and apparatus for providing visualization of information contained in a data set, the data set being arranged in first and second categories of data with the data contained in the first category represented by visualization elements, and the data contained in the second category represented by various attributes of the visualization elements.

A first data subset from the second category is chosen as a selection variable, and a second data subset from the second category is chosen as a summary variable.

A visualization element from the first category is located for each unique value of the selection variable, and a statistical summary of the summary variables is computed for each located visualization element. The display is then generated based on the computation of the statistical summary.

BRIEF DESCRIPTION OF THE DRAWINGS

In the drawings:

FIG. 5 illustrates display of text as part of a "drill down" function possible with the instant invention;

FIG. 7 illustrates a further filter technique which demonstrates a diversity measurement in accordance with the invention;

DETAILED DESCRIPTION

The instant invention is directed to the goal of achieving visualization of nearly any type of information stored in a large and complex database. One example of the type of data to be visualized is the data stored by telephone service providers relating to calls made by subscribers. Accordingly, although the instant invention is not limited to a database containing call detail information, such a database will be described hereinafter as an example of one embodiment of the instant invention.

A call detail record is a description of a telephone call. The processing and analysis of call detail records forms a major part of any telecommunications company's business. Typical uses of the records are for billing, to inform customers of their usage and charge them appropriately; for network operations, to examine the behavior of the network, analyze network faults, and assist in forecasting future requirements; for security, to detect or investigate possible instances of fraud; and for marketing, to analyze customer needs and respond with suitable offerings or campaigns. Of course, many of these applications rely to some degree on roll-ups or summaries of the call detail records, but all have occasion to examine individual records.

In most current applications, simple text is used to represent call detail, with the classic example being the printed telephone bill. Somewhat more complex representations are also available, in which there is interaction with a database of call detail records to provide various static plots (bar charts, pie charts, maps) of roll-ups of the information. However, even with this more complex arrangement, the contents of individual records are presented textually.

The invention described herein provides a graphical presentation of large amounts of stored information, which for this embodiment is call detail records. The invention extracts records from a database and displays them. The user may interactively change the way in which the records are displayed and filter the records by their content. The software comprising the invention may be run standalone, or may be incorporated as a module of another program.

Figure 1:
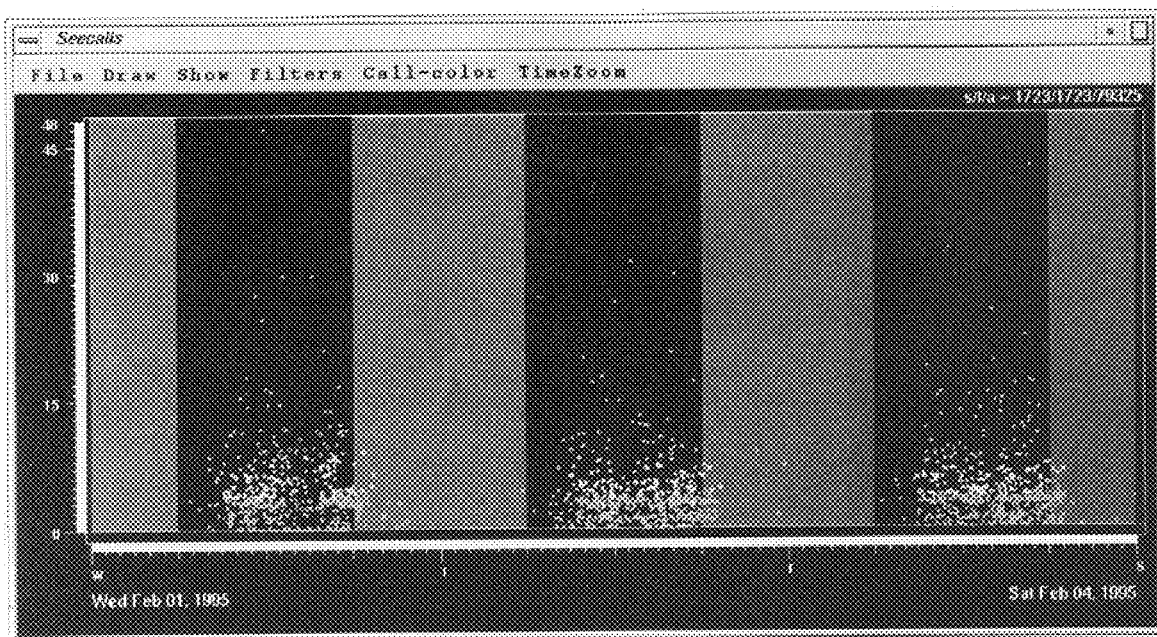
FIG. 1 illustrates a first screen detailing data records with color coding.

FIG. 1 shows a typical screen, while utilizing the instant invention. The fields of a call detail record vary considerably depending on the source of the record (e.g., original data or final customer bills). However, it can be safely assumed that the record will have fields giving the start time and duration of the call. These two fields are used to generate a scatterplot view of the call detail records, with start time on the X-axis and duration on the Y-axis. In other types of databases, similar fields may be used to generate a scatterplot as in the instant invention, or some other presentation of the data more suited to the database contents may be used. In other types of databases, similar fields may be used to generate a scatterplot as in the instant invention, or some other visual presentation of the data may be used. In the scatterplot representation, calls may be represented by points, as in FIG. 1, or by any of several other glyphs. The color of the glyphs may be determined by other fields of the call detail record: In FIG. 1, the color corresponds to the call charge. The light and dark background bands in the plot show business hours (defined as 6:00 a.m. to 6:00 p.m. Monday through Friday).

Figure 2A:
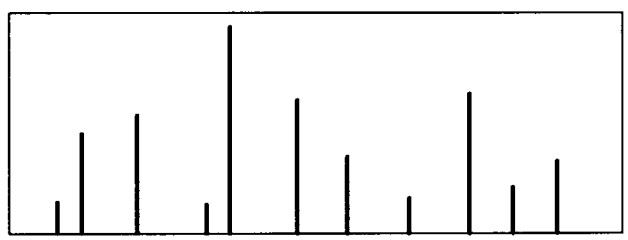
FIGS. 2A–2D illustrate various glyphs possible for use with the instant invention.
Figure 2B:
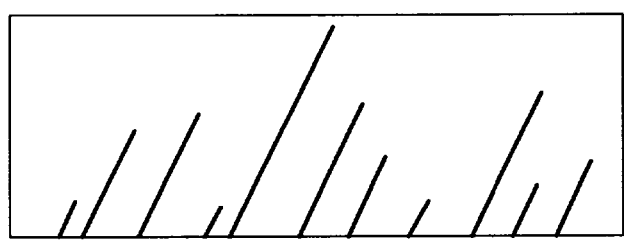
Figure 2C:
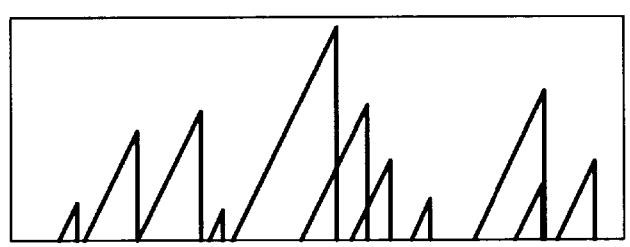
Figure 2D:
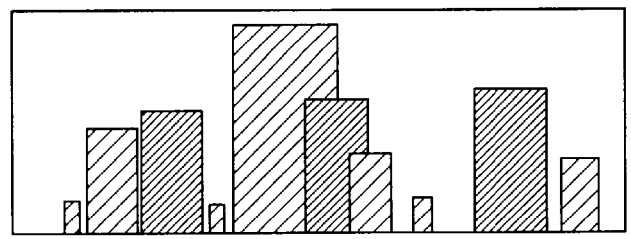

For this embodiment, the instant invention requires that all database records have at least one time-valued field. For call detail records this is the start time, with a second field being the duration of the call. These two fields are used to plot the glyphs representing the calls. In FIG. 1, each call detail record is drawn as a point located at the coordinate <start, duration>. Other glyphs are shown in FIGS. 2A–D. Any of these may have some advantage for a particular application; for example, the sawtooth plot in FIG. 2(C) is useful for some types of fraud detection, since calls that overlap are obvious indications that simultaneous calls are being charged to the same billing number. The bar graph in FIG. 2D achieves a similar result.

The usefulness of a visualization may be improved by the use of interaction. In the instant invention, each of the views may also act as a user input device. Each record in the internal database is either selected or unselected. User interactions with the views change the status (selected or unselected) of each record, an operation called filtering. After each filtering operation, all the views immediately update to reflect the new status information.

The scatterplot display can be used to filter records by start-time and duration. By adjusting a "slider" associated with each axis (visible as light colored bands in FIG. 1) the user can define a range of times through use of the slider. Only calls lying within that range are displayed, although others may have been extracted from the database. Additional commands can also adjust the scales so the selected time ranges occupy the entire screen.

Figure 3A:
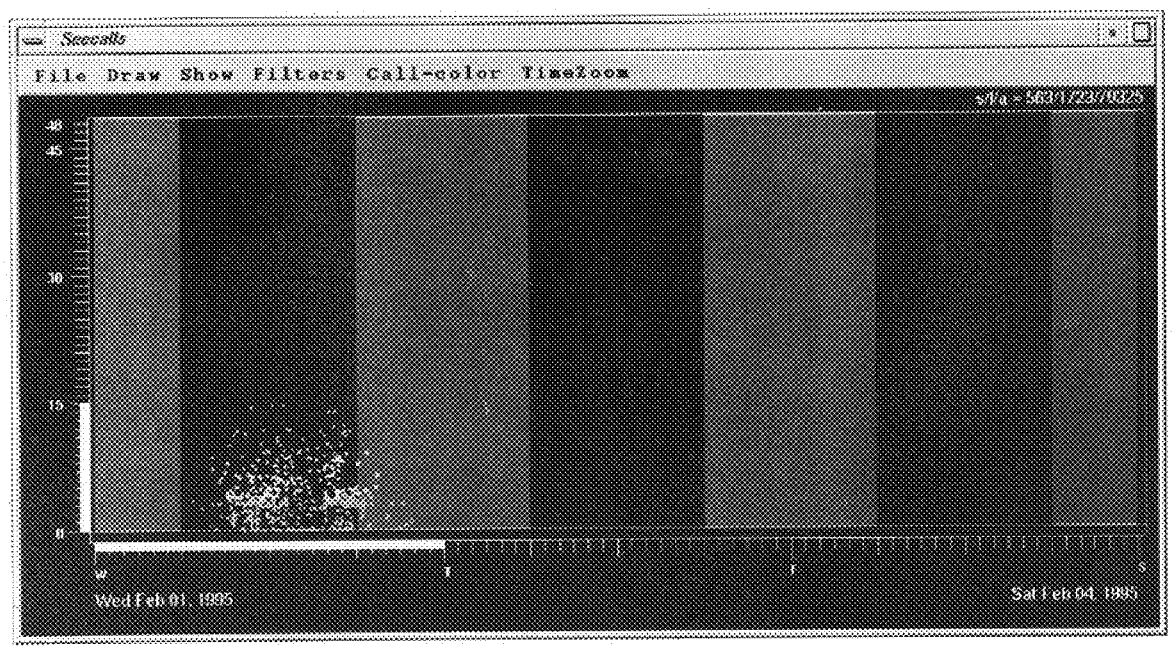
FIG. 3 illustrates the use of sliders to filter displayed data.
Figure 3B:
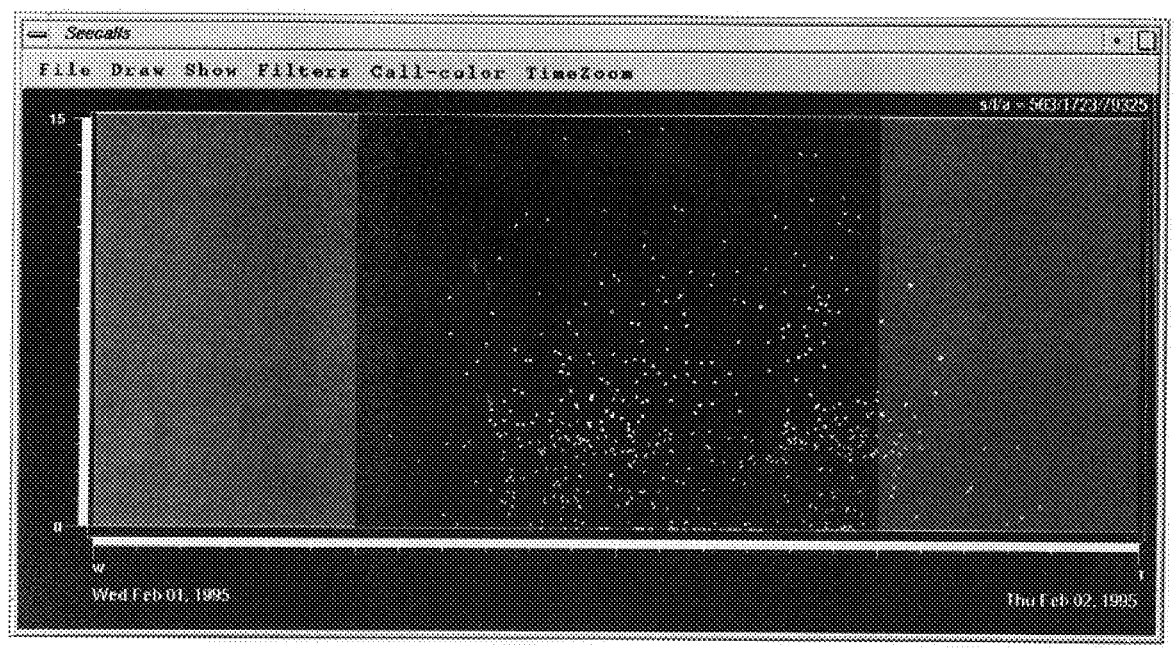

Referring now to FIGS. 3A and 3B, this illustrates a situation where the user first adjusts the start time slider to select only a single day and the duration slider to select calls under fifteen minutes, then expands the scales as shown in FIG. 3B. The text "s/l/a=563/1723/79325" in the upper right of the view, reminds the viewer that 563 calls are currently selected (visible). Also, 1723 calls are loaded into the software, and 79325 calls are available in the database.

Figure 4:
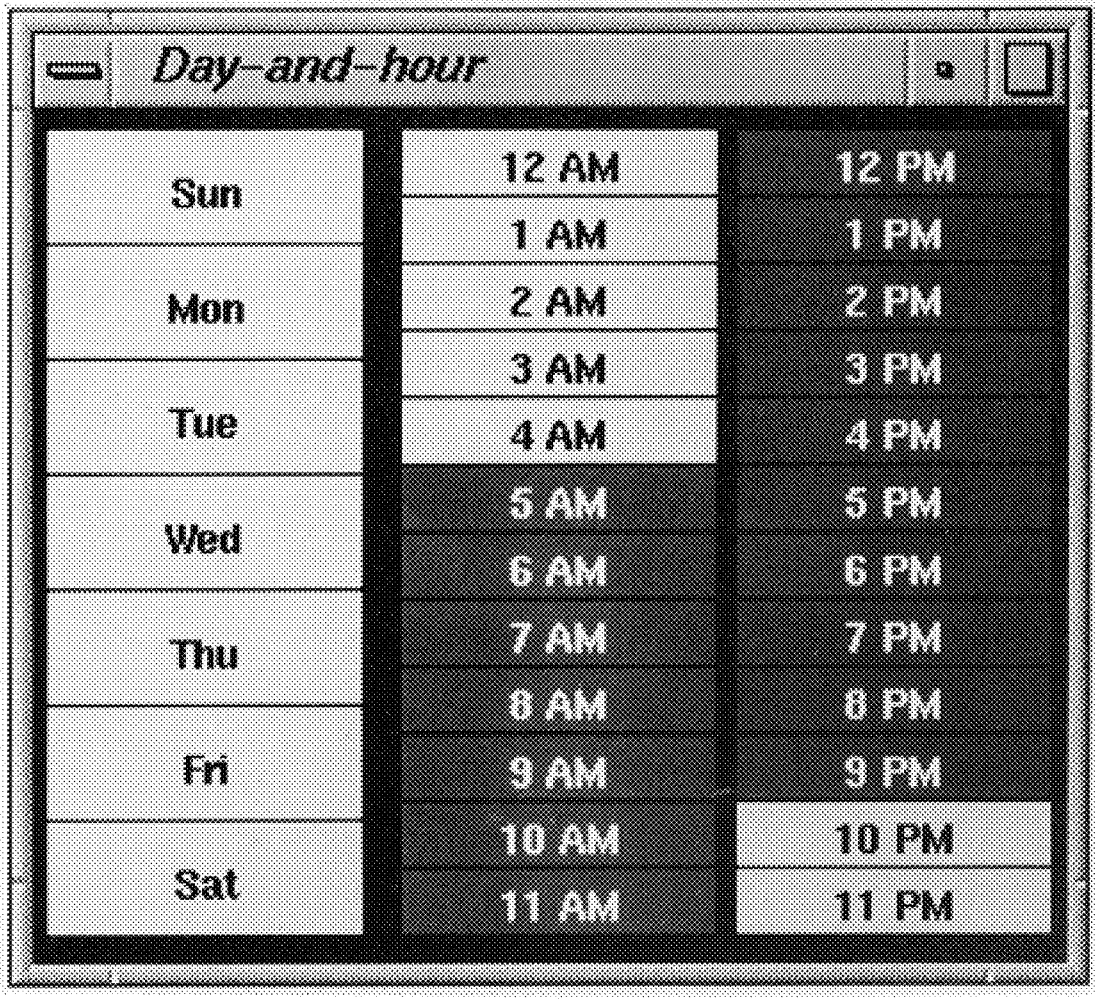
FIG. 4 illustrates a day and hour filter.

The day-and-hour filter screen shown in FIG. 4 may also be used to filter calls by start time. The user may turn these bars on or off to select or deselect calls. In the figure, only calls made between 10:00 p.m. and 5:00 a.m. are selected as indicated by the light colored bars.

Figure 5:
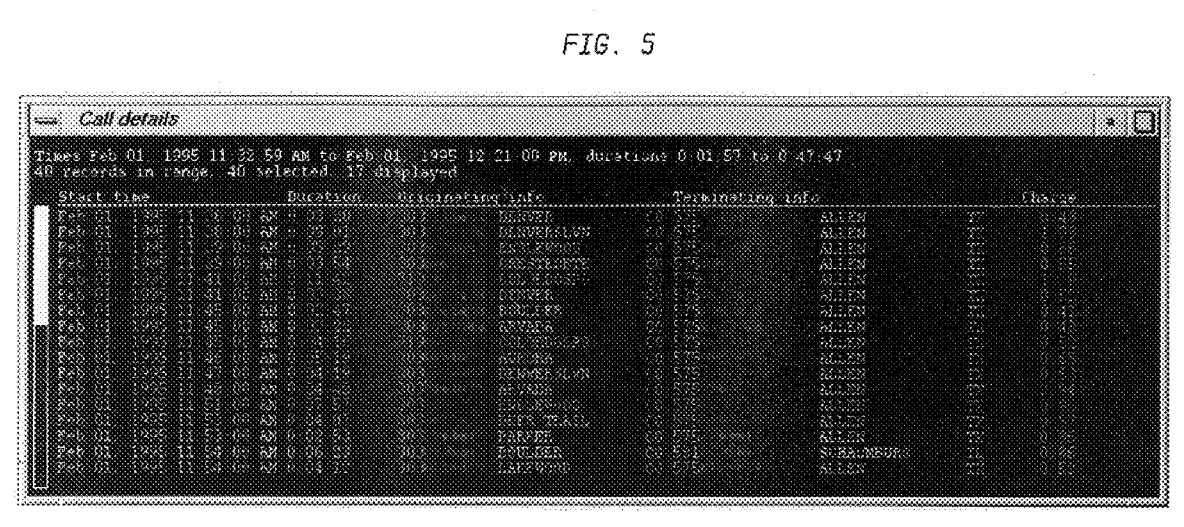

A textual representation of the call detail information can also be obtained. A mouse may be used to select records in the main view, and these are displayed in the textual view. FIG. 5 shows such a view, with some customer-confidential fields discreetly blurred. Each line represents a single record, and the color of the line is the same as the color of the glyph in the main view, shown in FIG. 1.

As already noted, call detail records vary considerably. Typical fields, in addition to the start-time and duration fields, include telephone numbers (originating, dialed, terminating, billing, etc.), originating and terminating locations, type-of-service codes, billing codes, tariff or other rate information, and charge. The instant invention treats all these fields equally, as string-valued variables. Thus, each call detail record consists of the start-time, duration, and a vector of strings. Similar fields are possible for other types of stored information other than call detail.

Each field can be used to select or deselect call-detail records via a bar chart view. A menu bar item in the main view provides access to these views. Selecting one of these brings up a window containing the bar chart view.

Figure 6:
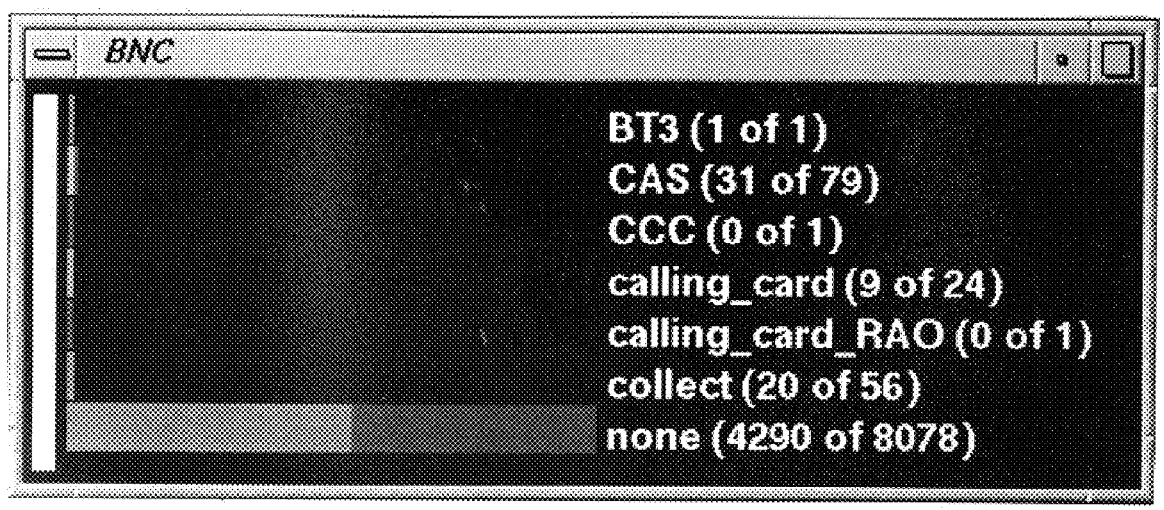
FIG. 6 illustrates a further filtering technique possible with the instant invention.

A view for a field named BNC (billing code), is shown in FIG. 6. The view consists of a bar chart, where each bar represents one possible value of the field. The total length of the bar is proportional to the number of records containing that value, while the length of the colored portion of the bar is proportional to the number of selected (visible) records. The label of the bar is simply the contents of the field, followed by "(M of N)" to indicate N records are loaded and M are selected. For example, 24 of the loaded records were billed to a calling card, and 9 of these records are currently selected and visible in the main view. The bars are always colored from top to bottom in a spectrum. Using the menu, the user can select any one of the fields to determine the color of the glyphs in the main view and the call detail view.

FIG. 7 shows another barchart view, this one directed to calls for a terminating country. A diversity measure has been defined which pairs the terminating country field to the terminating number field, and which produces for each distinct value of the first (terminating country) field the number of distinct values of the second (terminating number) field. This diversity measure is displayed in the bar chart labels as "M/D of N", indicating N records are loaded, M are selected, and the selected records have D distinct values in the associated field. For example, the figure shows that there are 909 loaded records that terminate in Germany (abbreviated "grmny"), 514 of which are selected, and that these selected records go to 88 distinct numbers. This diversity measure is extremely useful in applications such as fraud detection, where both high (most calls to different numbers) and low (most calls to a single number) diversity can indicate a possible problem with fraudulent use of another's telephone number.

It is to be understood that the diversity measure referred to above is one example of a statistical summary, but other types of statistical summaries could also be performed in accordance with the instant invention.

Figure 8A:
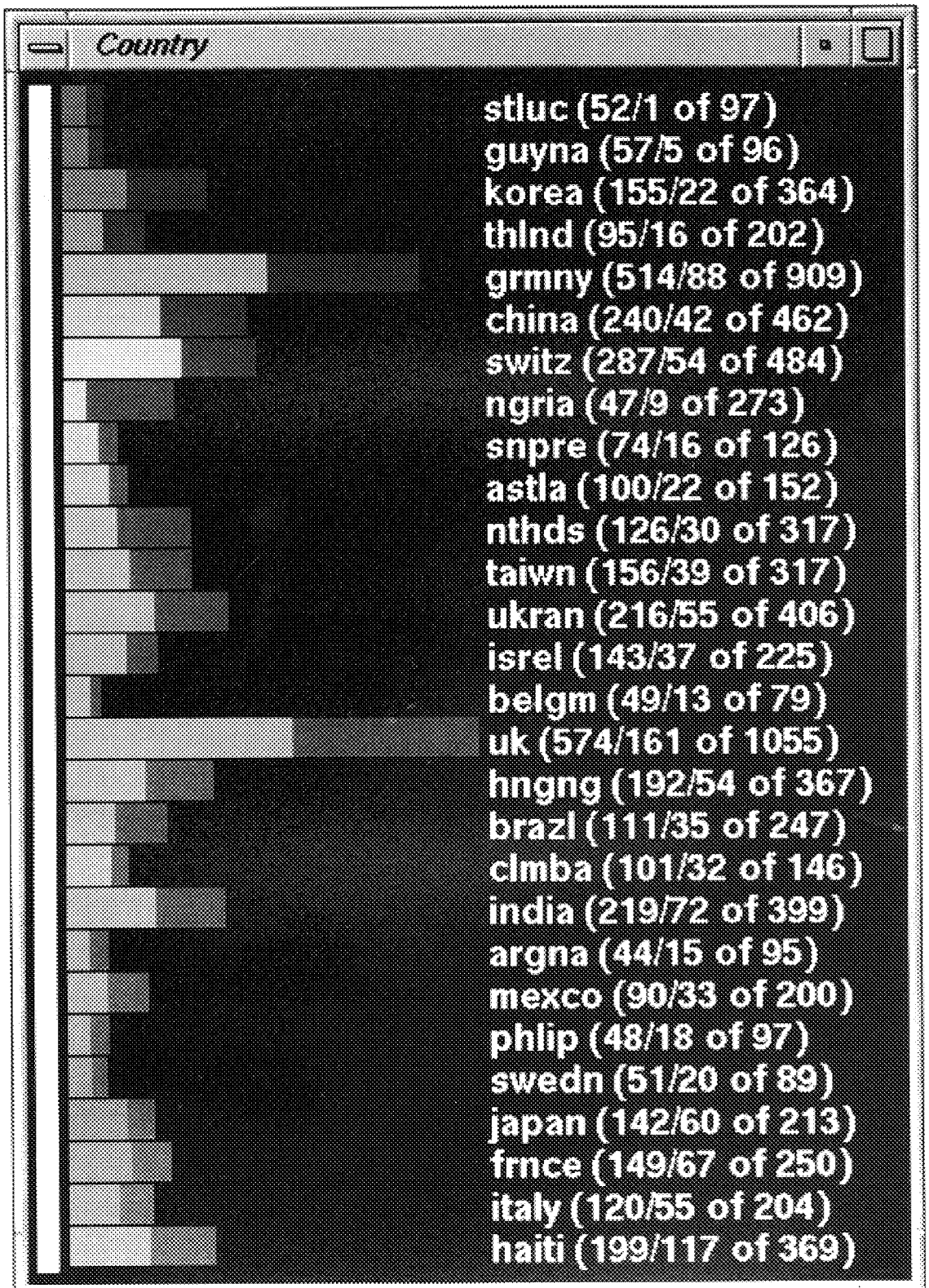
FIGS. 8A–8C illustrates further display of diversity measurements.
Figure 8B:
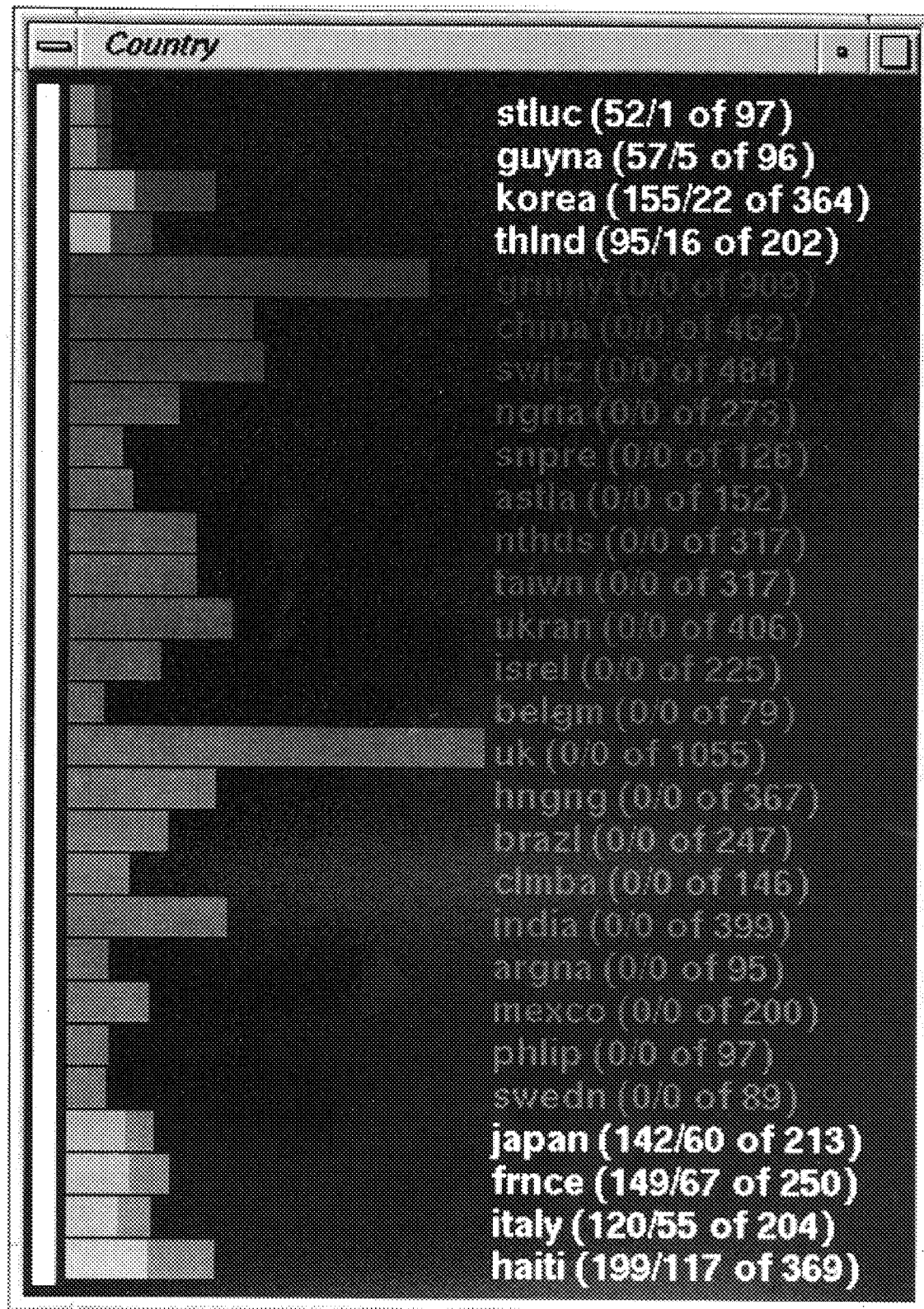
Figure 8C:
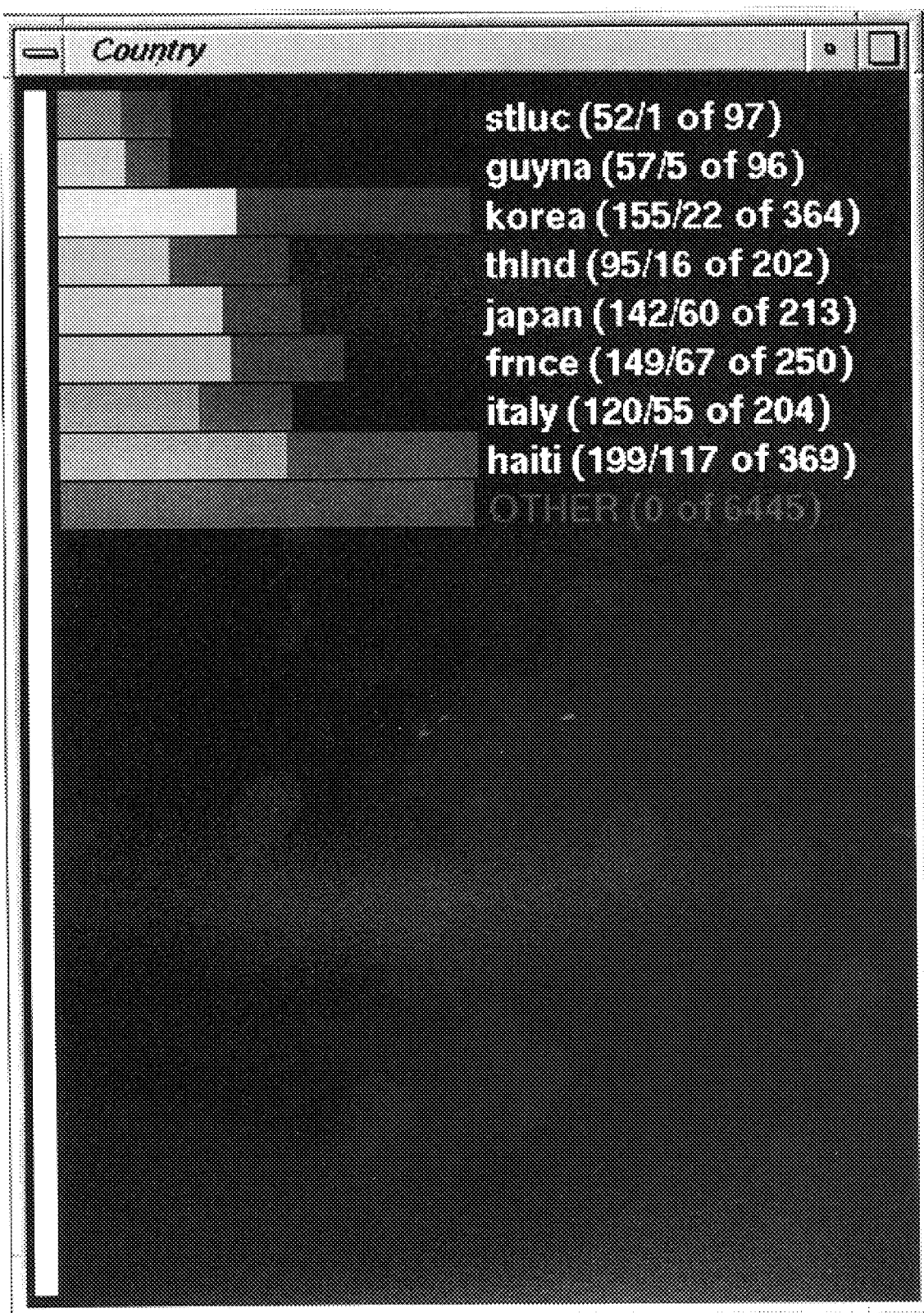

In all bar chart views, mouse actions can be used to select or deselect individual bars, and thereby select or deselect records with that value in the field. (A record is selected only if all its fields are selected). All the views are tightly linked, so selections or deselections in one view are immediately reflected in all other views. The user can also bring up a menu in the bar chart view which allows selection or deselection of all the bars, turning on or off the display of the count ("M of N") information, and sorting the fields in various ways. Two other menu options allow the user to group all unselected bars together and "spread" the color scale across the remaining ones. FIGS. 8A–C shows this operation applied to the country filter. The bar chart is first sorted by diversity in FIG. 8A, then the four most and least diverse countries are selected in FIG. 8B, and finally the bar chart is recolored in FIG. 8C.

The instant invention has been implemented for the embodiment of call details in C++ using Lucent Technologies Visual Insights Library. The Visual Insights Library uses C++'s object-oriented capabilities, factors out common code, embodies direct manipulation, and provides data abstractions for building highly interactive visualizations of large datasets based on linked views. In total, the instant invention contains about 3,500 lines of C++ code that runs on workstations supporting X11 and Motif, and on PC's running MS Windows.

The invention can be used as either a standalone program, or as a module within another program.

One of the primary design requirements was that the invention be applicable to the many possible formats of data records which for this embodiment use call detail records. As already discussed, the software implementing the inventive method assumes that each record has time-valued start-time and duration fields, and zero or more other fields whose contents are treated as strings. The exact database format is provided in the form of a configuration file which names the fields and describes their layout. The file also specifies the headers and format of the textual view.

Each field may be annotated to indicate special treatment. An "uninteresting" field is ignored; it is not loaded. A "ticked" field adds more information to the main view; color-coded tick-marks on the "audiotext" and "charged" lines indicate the value of that field, using the same color-coding as in the corresponding filter. A "diversity" annotation indicates that the diversity measurement of the field, with respect to another field, is to be calculated. Finally, a "query" field may be used by the viewer to access the database and load call detail records.

The configuration file can also specify a mapping file for each field. The mapping file translates the strings encountered in the database to other strings for display. A typical application of this feature is to translate codes into more-readily-understood strings, for example, translating a type-of-service code of "262" into "Inbound-800", or a state code of "13" into "Illinois."

As described above, the inventive software described herein displays the contents of an external database of transactions. Each external database record contains one or more arbitrary fields of information about the transaction. The external database may contain one time-valued field with the time at which the transaction was initiated, called the transaction-time field. The external database may also contain one duration-valued field, with the duration of the transaction, called the transaction-duration field. It is, of course, to be understood that fields other than time or duration could be used, depending on the type of data being analyzed.

Information from the external database is transferred to the inventive software by means of a query performed against the external database. This query may use standard database query technology, or a special-purpose interface. The query causes zero or more records to be extracted from the external database, which are then stored in an internal database. The records from the query may either replace those records already in the internal database, or may be added to those records. The records may be transformed as they are transmitted, for example, a table look-up may be applied to turn a numeric code into a more meaningful string.

It is to be understood that the terms "external data base" and "internal data base" are not meant to be limiting, but can refer to simple files and/or complete data bases stored in any applicable storage medium either physically, external or internal to the processor running the inventive steps of the claimed method.

The internal database stores both record and field information. Record information is, for each stored record, the value of each of the fields of the record. Field information is, for each field other than the transaction-time, and transaction-duration, the set of distinct values represented by that field, and for each of those values:

the number of instances of the value in all records (count);

a bit indicating if the value is selected (sel);

the number of instances of the value in all selected records (sel-count).

A record is selected if all its fields are selected, as illustrated below.

The internal database can also store a diversity measure between any two fields. One such diversity measure, written here as (F1, F2), is the count of distinct values of the second field F2 with respect to the first field F1, as previously illustrated in the discussion of FIG. 7. For the calculation of this diversity measure, the following information is kept for each distinct value of F1:

the number of distinct values of F2 in all records (div);

the number of distinct values of F2 in all selected records (sel-div).

Of course, it is to be understood that other diversity measures are possible. Each would be calculated in an appropriate manner, and would perhaps not use the above variables.

Let us now consider a database example for a sales record embodiment with the external database having the following pseudo-schema:

transaction-time: time transaction-duration: duration, seller: string, buyer: string, price: number;

and containing the following records:

| 8:04 | 1:52 | Bob | Fred | 21.39 |
| 8:17 | 2:31 | Sue | Bill | 1.50 |
| 8:23 | 2:31 | Bob | John | 21.39 |

-continued

| | | | | |
|---|---|---|---|---|
| 8:36 | 1:14 | Sue | Fred | 11.29 |
| 8:53 | 2:45 | Bob | Mary | 15.99 |
| 9:08 | 0:56 | Sue | Ellen | 31.00 |
| 9:17 | 1:25 | Bob | Mary | 18.75 |

If we perform the following query:

select* where 8:00<=transaction-time and transaction-time<=9:00 and replace the internal database with the result, the internal database will contain the following record information:

| | | | | |
|---|---|---|---|---|
| 8:04 | 1:52 | Bob | Fred | 21.39 |
| 8:17 | 2:31 | Sue | Bill | 1.50 |
| 8:23 | 2:31 | Bob | John | 21.39 |
| 8:36 | 1:14 | Sue | Fred | 11.29 |
| 8:53 | 2:45 | Bob | Mary | 15.99 |

It will also contain the field information for seller, buyer, and price:

| seller | count | sel | sel-count |
|---|---|---|---|
| Bob | 3 | true | 3 |
| Sue | 2 | true | 2 |

| buyer | count | sel | sel-count |
|---|---|---|---|
| Bill | 1 | true | 1 |
| Fred | 2 | true | 2 |
| Mary | 2 | true | 2 |

| price | count | sel | sel-count |
|---|---|---|---|
| 1.50 | 1 | true | 1 |
| 11.29 | 1 | true | 1 |
| 15.99 | 1 | true | 1 |
| 21.39 | 2 | true | 2 |

If a diversity measure between buyer and seller, that is, (buyer,seller) is requested it would contain:

| seller | div | sel-div |
|---|---|---|
| Bob | 2 | 2 |
| Sue | 2 | 2 | because seller Bob has two distinct buyers (Fred and Mary), and seller Sue also has two distinct buyers (Bill and Fred).

In the above, count is always equal to sel-count and div to sel-div because all the fields are selected and hence all the records are selected. However, now assume that buyer Mary is de-selected by some mechanism such as a user interaction. This would cause the de-selection of two records in the internal database, those with buyer Mary. The resulting field and diversity information would be:

| seller | count | sel | sel-count |
|---|---|---|---|
| Bob | 3 | true | 1 |
| Sue | 2 | true | 2 |

| buyer | count | sel | sel-count |
|---|---|---|---|
| Bill | 1 | true | 1 |
| Fred | 2 | true | 2 |
| Mary | 2 | true | 0 |

| price | count | sel | sel-count |
|---|---|---|---|
| 1.50 | 1 | true | 1 |
| 11.29 | 1 | true | 1 |
| 15.99 | 1 | true | 0 |
| 21.39 | 2 | true | 1 |

| seller | div | sel-div |
|---|---|---|
| Bob | 2 | 1 |
| Sue | 2 | 2 |

A display algorithm is invoked whenever the selections are altered. The algorithm first updates the main view, examining each record in the internal database to determine if it should be displayed; if so, the glyph for the record is drawn. As this takes place, the values of the sel-count in the field information and sel-div in the diversity information are incrementally computed. Once the main view is updated, the subsidiary views are redrawn.

The algorithm is as follows:

```
for each field F
do
    for each value of F
    do
        clear sel-count for that value of the field
    end
end
for each diversity (F1,F2)
do
    for each value of F1
    do
        create an empty variable sel-set for the value
        clear sel-div for the value
    end
end
for each record in the internal database
do
    if transaction-time is selected AND
      transaction-duration is selected AND
      the value of every other field is selected
    then
        for each field of the record
        do
            add 1 to sel-count for the value
        end
        for each diversity (F1,F2)
        do
            if field 12 is not in sel-set for field 1
            then
                add field 2 to the sel-set
                add 1 to the sel-div
            end
        done
        set color from the user-selected field
        draw the glyph
    end
end
destroy all sel-set variables
```

At the end of this algorithm, all selected glyphs have been drawn and the values of sel-count and sel-div have been updated. Destruction of the temporary sel-set variables recovers memory. In an alternate embodiment, these sets may be kept in the internal databases and used in other views.

Figure 9:
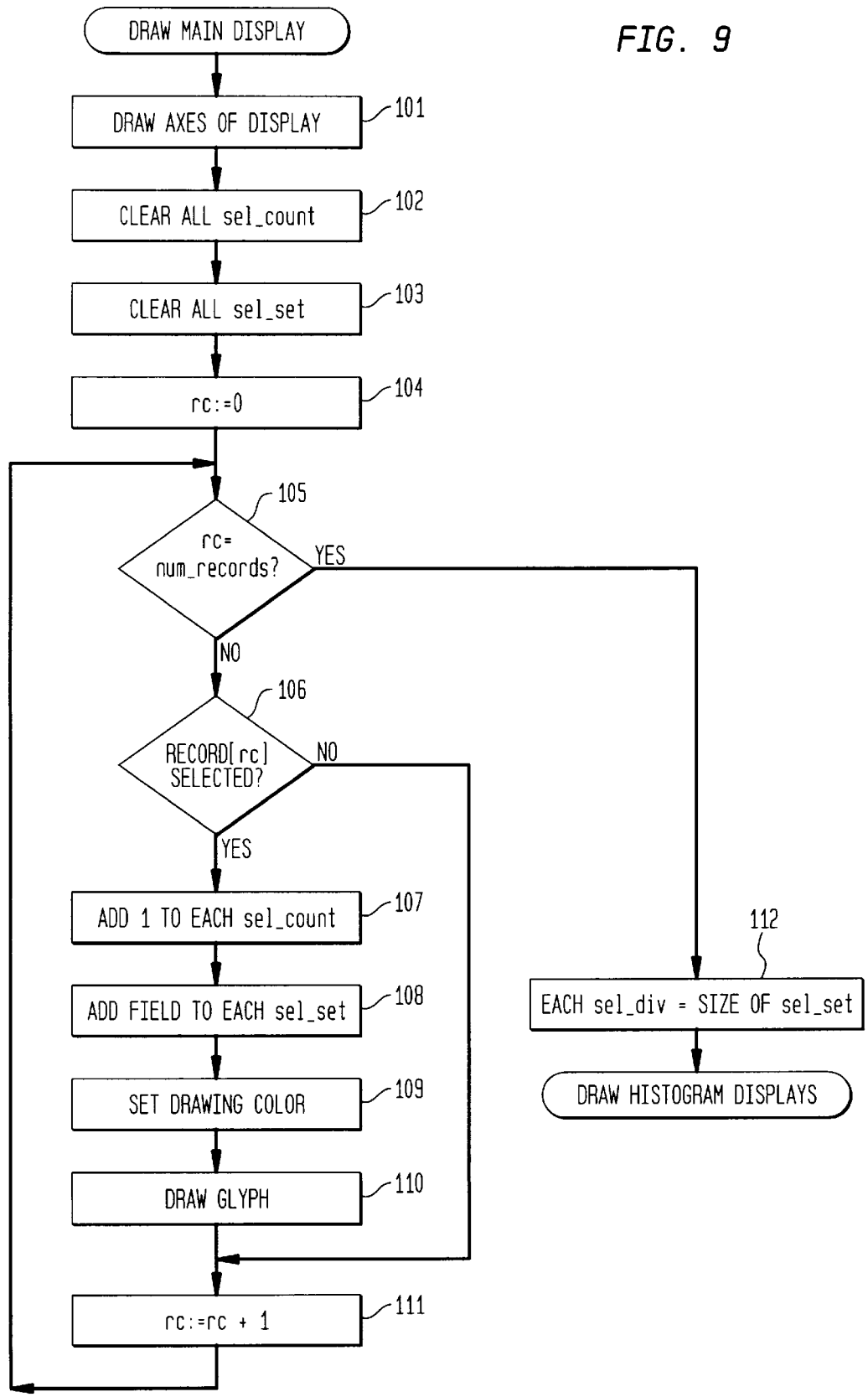
FIGS. 9–11 are flow charts describing operation of the invention.

Referring now to FIG. 9, there is shown a flow chart for the algorithm utilized to draw the main display as is shown in FIG. 1.

The display axes are first drawn at step 101, and the counters for the selections (sel) made by the user are cleared at step 102 and 103. There is one sel-count counter for each field, and one sel-set and one sel-div counter for each diversity measure.

A loop, controlled by variable "rc" is then entered. Each record is examined at step 105, and if the record is selected at step 106, the counters are updated at steps 107 and 108; and the glyph is drawn. The color of the glyph is set at step 109, and depends on the valve of a particular field chosen by the user. The glyph chosen is then drawn at step 110, with the variable "rc" being incremented at step 111.

When the algorithm is completed at step 112, all the sel-count variables contain the number of selected glyphs with the corresponding values, while the sel-div variables contain the number of unique values.

Thereafter, the algorithm proceeds to draw the bar chart displays.

Figure 10:
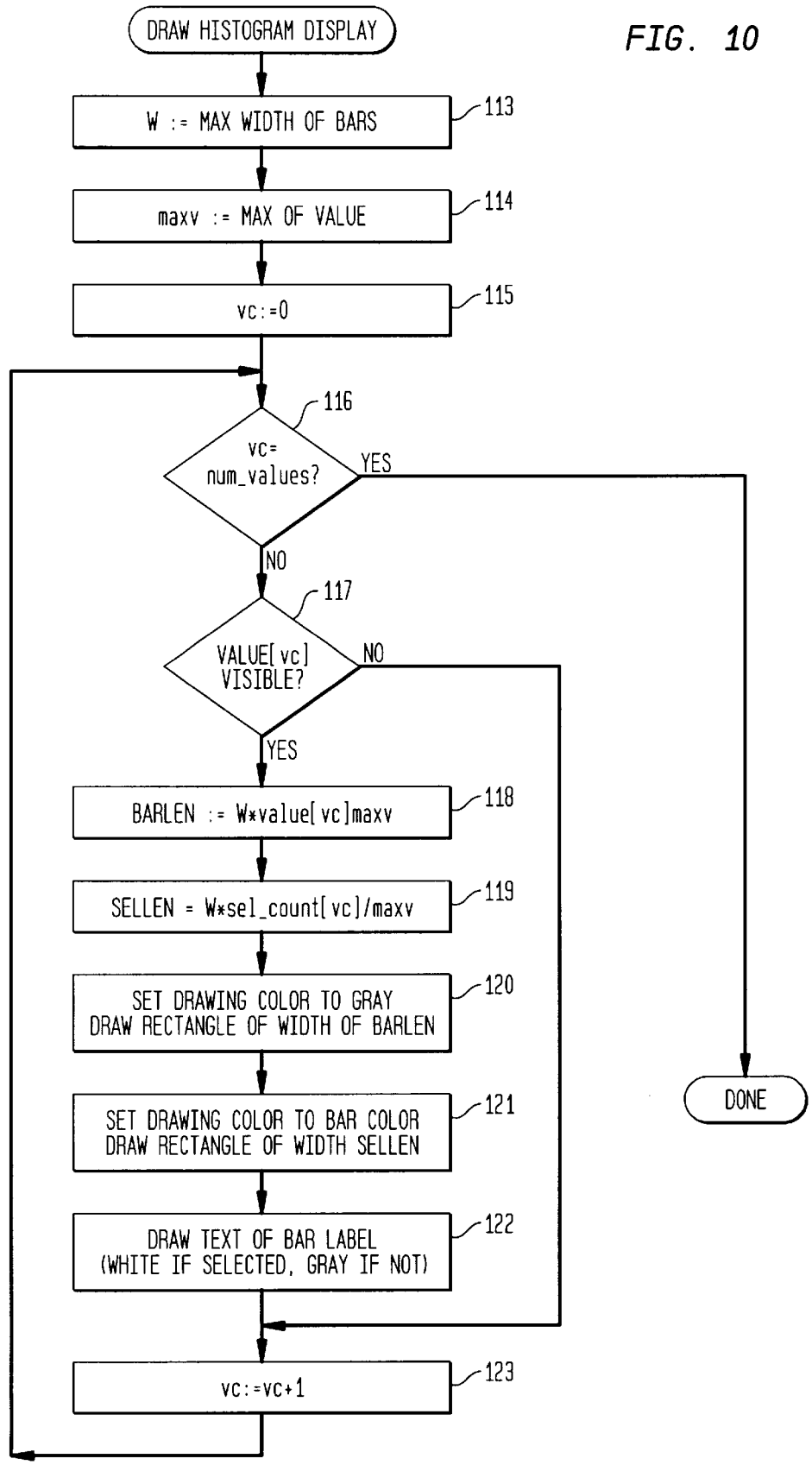

FIG. 10 illustrates the flow chart for the algorithm used for drawing a bar chart. The bar chart shows a field, and uses as data the frequency counts for the values of the field (array value), and the number of selected records for each value (array-count). The latter is computed by the main-view redisplay routine. The labels of the bar charts may also use the diversity measure (array sel-div) associated with each field value, which is also computed in the main-view display routine.

The width of the bars and the maximum value are determined first (step 113). These are used to calculate the sizes of the bars (step 114). The display routine then enters a loop (controlled by variable vc) that draws each distinct value (step 115).

The bar chart is scrollable, so a bar may not be visible. If it is visible, the sizes of the two parts of the bar are determined. The main bar has width proportional to the frequency count, (step 118), while the sub-bar has width proportional to the number of selected values (step 119). The main bar is then drawn in gray (step 120), and the sub-bar in the color appropriate to the bar (determined from the color scale the user has chosen (step 121).

The text of the bar label is then drawn at step 122, and the variable "vc" is incremented at step 123. When all appropriate values have been selected, the algorithm is completed.

Figure 11:
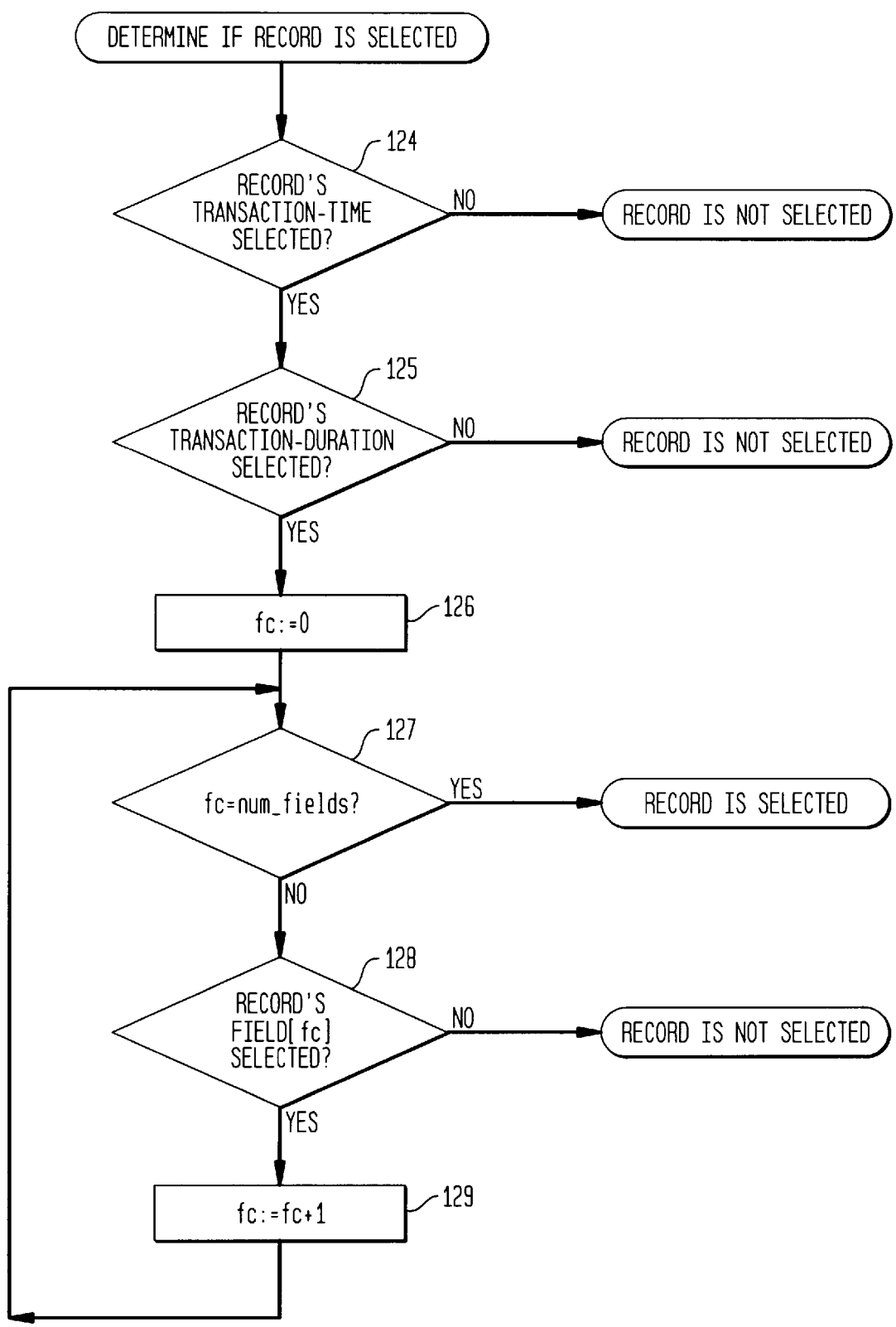

Referring now to FIG. 11, there is shown the steps for determining if a particular record is selected. A record is selected at step 124 if the transaction-time and transaction-duration are selected, and if, for every field of the record, the field value is selected (Step 125). The latter condition is tested by the loop controlled by the variable "fc" (Step 126).

Variables "rc", "vc", "fc", are simple counters which take on values 0,1, . . . number-of-records (or number-of-values, or number-of-fields). They are used to index the arrays of records, values, and fields stored in the internal database (Steps 127–129).

The instant invention uses several techniques to make efficient use of screen display space, provide an intuitive user interface, and enhance the user's ability to perceive patterns in the data.

1. The technique of linking views together, so that changes performed in one view are immediately reflected in all others, allows rapid interactive experimentation to detect and isolate patterns in the data.
2. The ability to filter call records by any of their fields through the field filter bar charts, the day-and-time filter, and the sliders in the main view enables the user to focus on subsets of the data that are of particular interest.
3. Color-coding of the glyph, tick-mark, and text representations of calls by the fields of the call detail record enhances the user's ability to interpret these representations and mentally segregate calls by attributes.
4. The use of tick marks (FIG. 10) allows the main display to show the values of multiple fields of each call detail record in a small space, making possible a display with a high "data to ink" ratio.
5. The various textual aids, such as the text view of selected call records and the counts and diversity measures displayed in the field filters, give the user a way to quickly determine exact values, while not detracting from the "big picture" view conveyed by the graphics.
6. The ability to choose among various call glyphs (FIG. 2) enables the user to select the representation that most clearly shows the desired pattern. For example, the point glyphs are useful when looking for outlying values, while the "sawtooth" glyph is ideal for detecting over-lapping calls.

A user of the invention can interact with it using the mouse, keyboard, or other interface technology. These interactions may be divided into four main groups:

1. Tool-level interactions. This includes exiting the inventive software, saving or printing information, performing queries, and bringing up subsidiary views.
2. View-level interactions. This includes actions that modify the way the information is displayed. For example, choosing point or line glyphs, turning labels on and off, sorting the bar charts in various ways, and selecting a field to be used to color the glyphs in the main view.
3. Selection interactions. This includes actions that change the selected state of the field values or records.
4. Drill-down interactions. This includes actions that select records for display in the textual drill-down view.

In the embodiment described herein, the tool-level and view-level interactions are handled through pull-down and pop-up menus. Selection interactions modify the internal database selection information. The changes in selections are propagated to all views, causing them to update in accord with the new values. Selection interactions fall into two groups.

Selection on the transaction-time and transaction-duration fields may be performed by interactive scaling of the axes of the main-view scatterplot. The user can adjust the axes so that any continuous portion of either axis range is chosen. The records for glyphs which lie outside the chosen portion are de-selected. These glyphs are normally not plotted, but (through a view-level interaction), the user may choose to have them plotted with an alternate glyph which shows that the record does not lie within the selected portion. For example, when vertical-line glyphs are used, calls which exceed the chosen upper bound of the transaction-duration axis may be plotted as a line extending the height of the plot with an arrow on the upper end.

The second type of selection interaction is performed on the bar-chart views of field information. The user may select and de-select individual bars, which causes selection and de-selection of the corresponding fields.

The current embodiment, also includes a drill-down interaction. By sweeping out a rectangle on the main view, the user defines a range of transaction-time and transaction-duration. This range is propagated to the textual drill-down view, and only records lying within the range are displayed. This range does not modify the selection state of records or fields.

A second drill-down interaction may be utilized with the bar-chart or text view, to invoke a query and add/replace internal database records. For example, if the user positioned the cursor over a bar representing seller "Bob" and invoked this drilldown, the tool would query the external database for all records containing seller "Bob" and add them to (or replace) the records in the internal database. This facility would permit browsing of the database, for example, to trace chains of suspicious transactions.

The implementation disclosed herein is to be regarded in all respects as merely illustrative and exemplary, and the invention claimed herein is not defined by the disclosed implementation, but instead by the claims as interpreted according to the doctrine of equivalents.

What is claimed is:

1. A method of providing visualization of information contained in a data set, the data set comprising a first category of data represented by visualization elements and a second category of data represented by various attributes of said visualization elements, the method comprising the steps of:

choosing a first data subset from the second category of data as selection variable;

from the visualization elements of the first category of data, locating elements having a particular value of the selection variable;

for the located elements, computing the number of distinct values of the telephone numbers at which telephone calls are terminated for each unique terminating country; and generating a display based on the computation of the numbers of distinct values.

2. A method of providing visualization in accordance with claim 1, further including the steps of:

choosing a second data subset from the second category of data as a summary variable; and computing a two dimensional statistical summary for the located visualization elements.

3. A method of providing visualization in accordance with claim 1, further including the steps of:

choosing a second data subset from the second category of data as a summary variable; and computing a statistical summary for the located visualization elements, said computed statistical summary having more than two dimensional.

4. A method in accordance with claim 1, wherein said selection variable is a designation for a particular number data field at which number a telephone call is initiated.

5. A method in accordance with claim 1, wherein said computing step includes the calculation of a diversity measure.

6. A method in accordance with claim 1, further including a step for extracting the data set from a database.

* * * * *